United States Patent
Xi et al.

(10) Patent No.: US 8,531,798 B1
(45) Date of Patent: Sep. 10, 2013

(54) DISK DRIVE ADJUSTING SERVO BURST SIGNALS TO COMPENSATE FOR RADIAL VELOCITY OF THE HEAD

(75) Inventors: Wei Xi, Mission Viejo, CA (US);
Abhishek Dhanda, Mission Viejo, CA (US); Guoxiao Guo, Foothill Ranch, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 459 days.

(21) Appl. No.: 12/966,474

(22) Filed: Dec. 13, 2010

(51) Int. Cl.
*G11B 5/596* (2006.01)
(52) U.S. Cl.
USPC ............... 360/78.14; 360/78.04; 360/77.08
(58) Field of Classification Search
None
See application file for complete search history.

(56) References Cited

U.S. PATENT DOCUMENTS

| | | | |
|---|---|---|---|
| 4,438,467 A | 3/1984 | Schaller et al. |
| 4,669,004 A | 5/1987 | Moon et al. |
| 5,381,281 A | 1/1995 | Shrinkle et al. |
| 5,483,393 A | 1/1996 | Mento et al. |
| 5,710,677 A | 1/1998 | Teng et al. |
| 5,798,883 A | 8/1998 | Kim |
| 5,870,243 A | 2/1999 | Ukani et al. |
| 5,930,068 A | 7/1999 | Gregg et al. |
| 5,946,158 A | 8/1999 | Nazarian et al. |
| 5,982,173 A | 11/1999 | Hagen |
| 6,005,739 A | 12/1999 | Yun |
| 6,067,204 A | 5/2000 | Tremaine |
| 6,091,564 A | 7/2000 | Codilian et al. |
| 6,091,567 A | 7/2000 | Cooper et al. |
| 6,101,064 A | 8/2000 | Shepherd |
| 6,144,513 A | 11/2000 | Reed et al. |
| 6,151,180 A | 11/2000 | Bang |
| 6,163,419 A | 12/2000 | Sobey et al. |
| 6,172,836 B1 | 1/2001 | Bang |
| 6,369,974 B1 | 4/2002 | Asgari et al. |
| 6,445,522 B1 | 9/2002 | Tsunoda et al. |
| 6,476,997 B2 | 11/2002 | Fukushima et al. |
| 6,611,397 B1 | 8/2003 | Nguyen |
| 6,687,080 B2 | 2/2004 | Smith et al. |
| 6,735,040 B2 | 5/2004 | Galloway et al. |
| 6,754,016 B2 | 6/2004 | Messner et al. |
| 6,768,609 B2 | 7/2004 | Heydt et al. |
| 6,791,778 B2 | 9/2004 | Chu et al. |
| 6,906,883 B2 | 6/2005 | Chu et al. |
| 6,937,420 B1 | 8/2005 | McNab et al. |
| 6,954,323 B2 | 10/2005 | Deeman et al. |
| 6,989,956 B2 | 1/2006 | Takaishi et al. |
| 7,009,391 B2 | 3/2006 | Lee et al. |
| 7,019,937 B1 | 3/2006 | Liikanen et al. |
| 7,023,637 B1 | 4/2006 | Kupferman |
| 7,027,257 B1 | 4/2006 | Kupferman |
| 7,061,708 B2 | 6/2006 | Ehrlich et al. |
| 7,082,005 B2 | 7/2006 | Annampedu et al. |

(Continued)

FOREIGN PATENT DOCUMENTS

JP 2001256741 A 9/2001

*Primary Examiner* — Andrew L Sniezek

(57) ABSTRACT

A disk drive is disclosed comprising a head actuated over a disk comprising a plurality of servo sectors that define a plurality of servo tracks, wherein the servo sectors comprise a plurality of servo bursts. A radial velocity of the head is detected relative to the servo tracks. At least two of the servo bursts are read to generate servo burst signals, and the servo burst signals are adjusted in response to the radial velocity of the head. A position error signal is generated for the head in response to the adjusted servo burst signals.

26 Claims, 4 Drawing Sheets

(56) References Cited

U.S. PATENT DOCUMENTS

| | | |
|---|---|---|
| 7,123,433 B1 | 10/2006 | Melrose et al. |
| 7,130,146 B2 | 10/2006 | Ehrlich |
| 7,149,048 B1 | 12/2006 | Ray et al. |
| 7,158,333 B1 | 1/2007 | Sutardja et al. |
| 7,161,759 B1 | 1/2007 | Zhang et al. |
| 7,180,696 B2 | 2/2007 | Ehrlich |
| 7,203,024 B2 | 4/2007 | Lee et al. |
| 7,209,314 B2 | 4/2007 | Bandic et al. |
| 7,212,364 B1 | 5/2007 | Lee |
| 7,230,786 B1 | 6/2007 | Ray et al. |
| 7,230,789 B1 | 6/2007 | Brunnett et al. |
| 7,245,451 B2 | 7/2007 | Ehrlich |
| 7,248,426 B1 | 7/2007 | Weerasooriya et al. |
| 7,253,984 B1 | 8/2007 | Patapoutian et al. |
| 7,256,956 B2 | 8/2007 | Ehrlich |
| 7,265,933 B1 | 9/2007 | Phan et al. |
| 7,382,564 B1 | 6/2008 | Everett et al. |
| 7,391,583 B1 | 6/2008 | Sheh et al. |
| 7,397,621 B2 | 7/2008 | Hou et al. |
| 7,423,835 B2 | 9/2008 | Sado et al. |
| 7,450,336 B1 | 11/2008 | Wang et al. |
| 7,502,197 B1 | 3/2009 | Chue |
| 7,542,230 B1 | 6/2009 | Melrose et al. |
| 7,567,405 B2 | 7/2009 | Kato et al. |
| 7,616,399 B1 | 11/2009 | Chen et al. |
| 7,746,592 B1 | 6/2010 | Liang et al. |
| 7,746,594 B1 | 6/2010 | Guo et al. |
| 7,746,595 B1 | 6/2010 | Guo et al. |
| 8,077,428 B1 * | 12/2011 | Chen et al. ............ 360/75 |
| 8,189,286 B1 | 5/2012 | Chen et al. |
| 2007/0273992 A1 | 11/2007 | Kuroda |
| 2008/0239536 A1 | 10/2008 | Asakura |
| 2009/0040641 A1 | 2/2009 | Ehrlich et al. |
| 2009/0046385 A1 | 2/2009 | Yamamoto |
| 2009/0067084 A1 | 3/2009 | Lau et al. |
| 2009/0067090 A1 | 3/2009 | Ling et al. |
| 2009/0097157 A1 | 4/2009 | Spaur et al. |
| 2009/0316295 A1 | 12/2009 | Kim et al. |
| 2010/0053800 A1 | 3/2010 | Ozturk et al. |

* cited by examiner

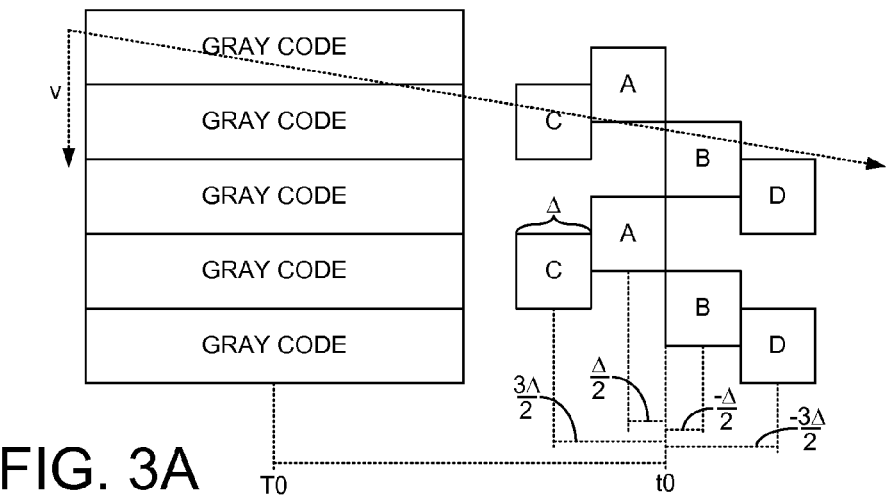

FIG. 3A $$\begin{bmatrix} \overline{C} \\ \overline{A} \\ \overline{B} \\ \overline{D} \end{bmatrix} = \begin{bmatrix} \cos(vTc) & \sin(vTa) & 0 & 0 \\ -\sin(vTc) & \cos(vTa) & 0 & 0 \\ 0 & 0 & \cos(vTb) & \sin(vTd) \\ 0 & 0 & -\sin(vTb) & \cos(vTd) \end{bmatrix} \begin{bmatrix} C \\ A \\ B \\ D \end{bmatrix}$$

FIG. 3B $\quad Ta = \frac{\Delta}{2} \quad Tb = \frac{-\Delta}{2} \quad Tc = \frac{3\Delta}{2} \quad Td = \frac{-3\Delta}{2}$ $$\begin{bmatrix} \hat{N} \\ \hat{Q} \end{bmatrix} = \begin{bmatrix} \overline{C} - \overline{D} \\ \overline{A} - \overline{B} \end{bmatrix} = \begin{bmatrix} \cos(vTc) & \sin(vTa) & \sin(vTb) & -\cos(vTd) \\ -\sin(vTc) & \cos(vTa) & -\cos(vTb) & -\sin(vTd) \end{bmatrix} \begin{bmatrix} C \\ A \\ B \\ D \end{bmatrix}$$

FIG. 3C $$\begin{bmatrix} \overline{N} \\ \overline{Q} \end{bmatrix} = \begin{bmatrix} \dfrac{1}{\cos(vTc)^2 + \sin(vTa)^2} & 0 \\ 0 & \dfrac{1}{\sin(vTd)^2 + \cos(vTb)^2} \end{bmatrix} \begin{bmatrix} \hat{N} \\ \hat{Q} \end{bmatrix}$$

FIG. 3D

TrackID = TrackID + round[v·(t0 − T0)]

FIG. 3E $$\bar{N} = N \cos(vTa) \qquad \bar{Q} = Q \cos(vTc)$$

$$\begin{bmatrix} \bar{N} \\ \bar{Q} \end{bmatrix} = \begin{bmatrix} \cos(vT_N) & \sin(vT_Q) \\ -\sin(vT_N) & \cos(vT_Q) \end{bmatrix} \begin{bmatrix} N \\ Q \end{bmatrix}$$

$$T_N = \frac{\Delta}{2} \quad T_Q = \frac{-\Delta}{2}$$

DISK DRIVE ADJUSTING SERVO BURST SIGNALS TO COMPENSATE FOR RADIAL VELOCITY OF THE HEAD

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 comprising a number of data tracks 4 defined by concentric servo sectors $6_0$-$6_N$ recorded around the circumference of each data track. Each servo sector 6, comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

BRIEF DESCRIPTION OF THE DRAWINGS

FIG. 3A shows an embodiment of the present invention wherein the servo burst signals are adjusted relative to a reference point defined by the servo bursts.

FIGS. 3B-3D show equations according to an embodiment of the present invention for adjusting an amplitude of the quadrature servo bursts signals relative to the reference point.

FIG. 3E shows an embodiment of the present invention wherein a track address signal is adjusted in response to the radial velocity of the head.

DETAILED DESCRIPTION OF EMBODIMENTS OF THE INVENTION

Figure 2A:
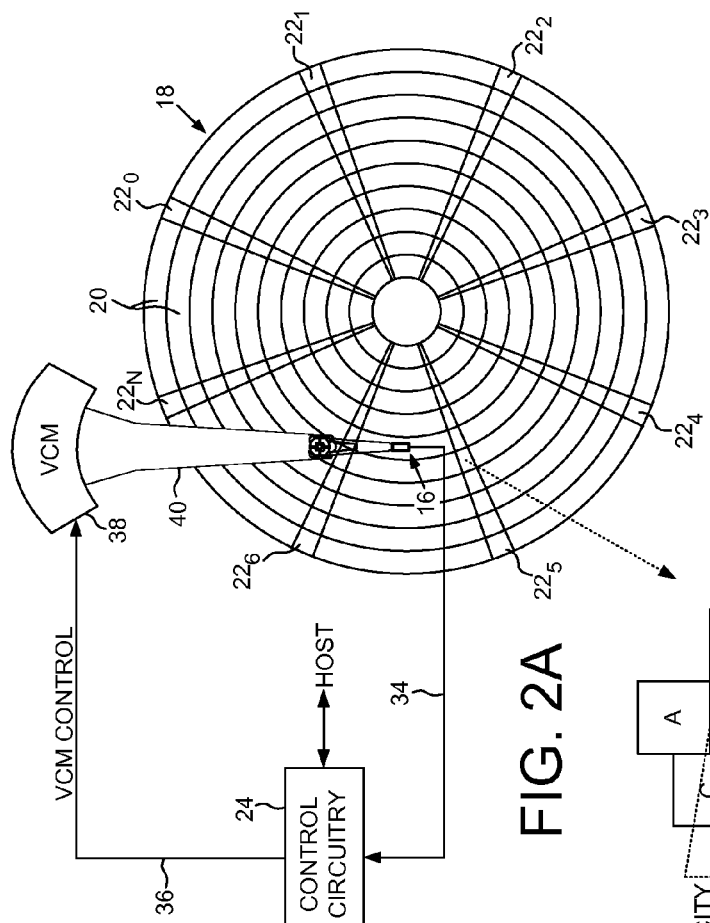
FIG. 2A is a disk drive according to an embodiment of the present invention comprising a head actuated over a disk comprising a plurality of servo sectors.
Figure 2B:
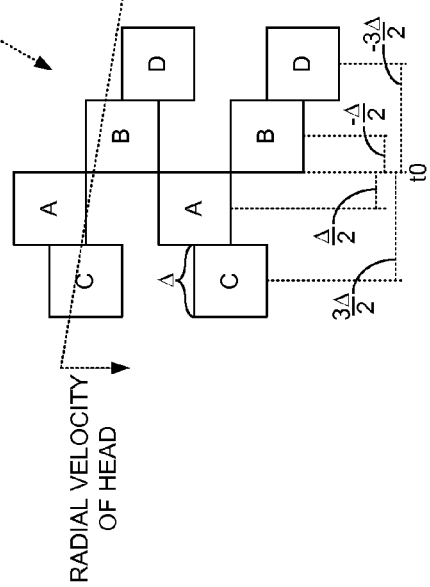
FIG. 2B illustrates a radial velocity of the head as it passes over the servo bursts of a servo sector, wherein the servo bursts comprise a quadrature pattern.
Figure 2C:
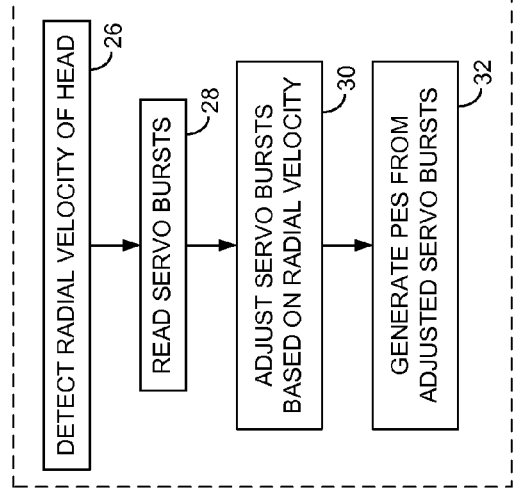
FIG. 2C is a flow diagram according to an embodiment of the present invention wherein servo burst signals are adjusted based on a detected radial velocity of the head.

FIG. 2A shows a disk drive according to an embodiment of the present invention comprising a head 16 actuated over a disk 18 comprising a plurality of servo sectors $22_0$-$22_N$ that define a plurality of servo tracks 20, wherein the servo sectors comprise a plurality of servo bursts (FIG. 2B). The disk drive further comprises control circuitry 24 operable to execute the flow diagram of FIG. 2C, wherein a radial velocity of the head is detected relative to the servo tracks (step 26). At least two of the servo bursts are read to generate servo burst signals (step 28), and the servo burst signals are adjusted in response to the radial velocity of the head (step 30). A position error signal is generated for the head in response to the adjusted servo burst signals (step 32).

In the disk drive of FIG. 2A, each servo sector comprises suitable position information, such as a track address providing coarse position information and servo bursts (e.g., as shown in FIG. 2B) providing fine position information. As the head 16 passes over a servo sector, the control circuitry 24 demodulates a read signal 34 emanating from the head into the position error signal (PES). The PES is filtered by a suitable compensation filter to generate a control signal 36 applied to a voice coil motor (VCM) 38. The VCM 38 rotates an actuator arm 40 about a pivot in order to position the head 16 radially over the disk 18 in a direction that reduces the PES.

When seeking the head radially over the disk to a target track, the velocity of the head as it crosses over the servo sectors introduces an error in the PES generated from reading the position information (e.g., the servo bursts as shown in FIG. 2B). The radial velocity of the head may also be significant while settling on the target track at the end of a seek operation. In yet another embodiment, the radial velocity of the head relative to the servo tracks may be non-zero due to an eccentricity of the servo tracks that is canceled by the servo system (not followed). In this embodiment, the actual velocity of the head may be near zero whereas the servo tracks may move relative to the head due to the eccentricity, thereby resulting in an effective radial velocity of the head relative to the servo tracks.

In embodiments of the present invention, the servo bursts signals generated from reading the servo bursts are adjusted to compensate for the radial velocity of the head relative to the servo tracks. For example, in one embodiment the servo burst signals are adjusted in response to the radial velocity of the head in order to effectively rotate the angled vector representing the path of the head as it crosses the servo bursts as shown in FIG. 2B so that the resulting vector is substantially orthogonal to the servo bursts at an intersection defined by a reference point relative to the servo bursts. In the example of FIG. 2B, a reference point t0 is defined at the middle of the servo bursts between the A and B servo bursts. Accordingly, in one embodiment the servo burst signals are rotated relative to this reference point so that the resulting vector is effectively rotated counterclockwise until it is substantially orthogonal to the servo bursts at the intersection defined by the reference point t0.

In one embodiment, an amplitude of the servo burst signals is adjusted in response to the radial velocity of the head. In the example of FIG. 3A, the servo bursts comprise a quadrature pattern comprising A, B, C and D servo bursts. An amplitude of the servo bursts is measured in response to the read signal (e.g., by integrating the read signal) as the head passes over each servo burst, and the PES is generated by evaluating the relative servo burst amplitudes using any suitable algorithm. FIG. 3B illustrates an embodiment of the present invention wherein the servo burst amplitudes are adjusted in response to the radial velocity (v) of the head as well as intervals Ta, Tb, Tc and Td defined relative to respective servo bursts and the reference point t0 as illustrated in FIGS. 3A and 3B. The higher the radial velocity, the larger the adjustment (rotation) to each servo burst amplitude. In one embodiment, the intervals Ta, Tb, Tc and Td are defined in terms of the sampling frequency of the read signal after synchronizing the sampling frequency to a preamble in the servo sector.

In one embodiment, the PES is generated by computing an N burst value representing the difference between the C and D servo bursts, and a Q burst value representing the difference between the A and B servo bursts. Accordingly, the matrix of FIG. 3B can be transformed into the matrix shown in FIG. 3C in order to directly adjust the N and Q burst values in response to the radial velocity of the head.

In one embodiment, the adjusted N and Q burst values computed from the matrix shown in FIG. 3C are normalized by adjusting the magnitude of the burst values as a function of the radial velocity of the head. FIG. 3D shows an example matrix for normalizing the adjusted N and Q burst values in response to the radial velocity of the head. The PES is then generated in response to the adjusted and normalized N and Q burst values.

FIG. 3A illustrates that each servo sector may comprise a Gray coded track address representing the address or ID of the corresponding servo track. In one embodiment, a track address signal is also adjusted in response to the radial velocity of the head, for example using the equation shown in FIG. 3E. In one embodiment, the track address is adjusted so as to substantially align with the rotated vector representing the path of the head as it crosses the servo bursts. That is, the track address is adjusted to correspond to the substantially orthogonal vector that intersects with the reference point t0 of FIG. 3A. In one embodiment, the interval T0-t0 is defined relative to the sampling frequency of the read signal after synchronizing the sampling frequency to a preamble in the servo sector.

Figures 4, 5A, 5B:
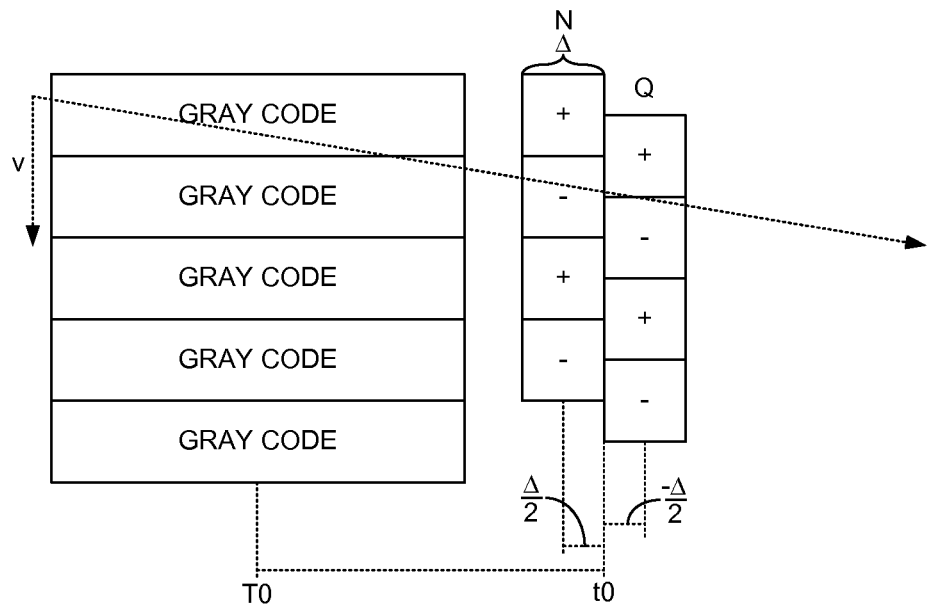
FIG. 4 shows an embodiment of the present invention for adjusting an amplitude of the servo bursts signals relative to the reference point for low radial velocities of the head.
FIG. 5A illustrates an embodiment of the present invention wherein the servo bursts of a servo sector comprise a nullphase servo pattern.
FIG. 5B shows equations according to an embodiment of the present invention for adjusting an amplitude of the nullphase servo bursts signals relative to a reference point.

In one embodiment when the velocity of the head is low (e.g., during settling or during track following when the servo tracks are eccentric), the N and Q burst values may be adjusted in response to the radial velocity of the head using the simplified shown in FIG. 4. In other words, the equations of FIGS. 3C and 3D can be approximated using the simplified equations of FIG. 4 for low head velocities, thereby reducing the computation time while maintaining sufficient performance.

Figure 1:
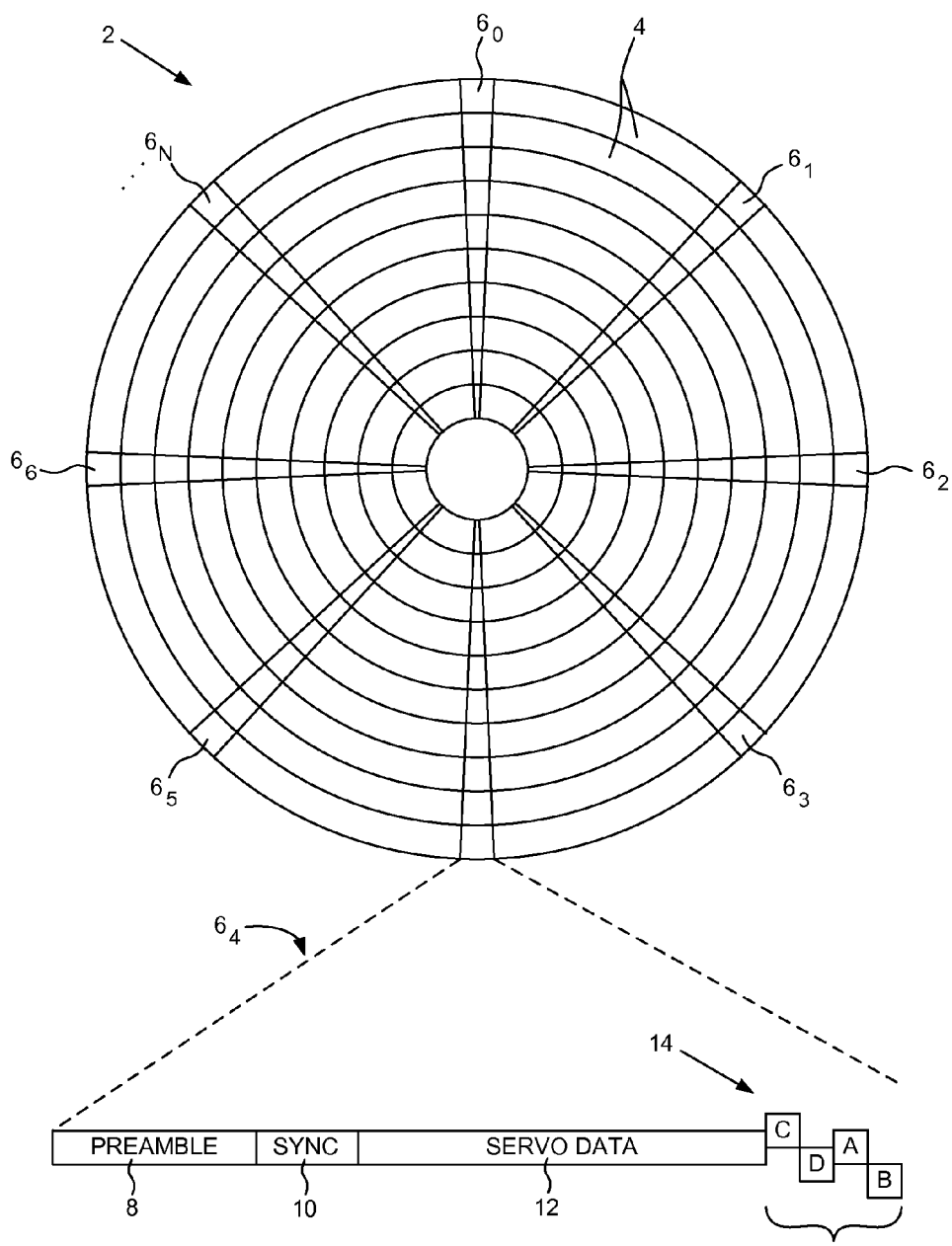
FIG. 1 shows a prior art disk format comprising a plurality of data tracks defined by embedded servo sectors.

The equations described in the above embodiments assume a quadrature servo pattern of the form CABD as shown in FIG. 2B. However, the quadrature servo bursts may be recorded in any suitable sequence to form any suitable pattern, such as CDAB as shown in FIG. 1. If the quadrature servo bursts are recorded in a sequence other than CABD, it requires a corresponding modification to the above described equations.

Any suitable servo pattern may be employed in the embodiments of the present invention in place of the quadrature servo pattern described above. In an embodiment shown in FIG. 5A, the servo bursts comprise a null-phase servo pattern wherein each servo burst is recorded at a particular phase offset (e.g., 0 degrees or "+" and 180 degrees or "−"). The amplitudes of the servo burst signals N and Q are adjusted in response to the radial velocity of the head according to the matrix shown in FIG. 5B, and the track address may be adjusted according to the equation shown in FIG. 3E. Similar to the embodiment of FIG. 3A, the reference point t0 in the example of FIG. 5A is selected as the middle of the servo bursts between the N and Q bursts. The reference point t0 for adjusting the servo burst signals may be selected at any suitable location relative to the servo bursts. In one embodiment, the reference point t0 may be selected so as to optimize the performance (maximize the signal-to-noise ratio (SNR)). For example, selecting a particular reference point relative to the servo bursts may improve the SNR by reducing quantization errors inherent in digital mathematics.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:

a disk comprising a plurality of servo sectors that define a plurality of servo tracks, wherein the servo sectors comprise a plurality of servo bursts;

a head actuated over the disk; and control circuitry operable to:

detect a radial velocity of the head relative to the servo tracks;

read at least two of the servo bursts to generate servo burst signals;

adjust the servo burst signals in response to the radial velocity of the head; and generate a position error signal for the head in response to the adjusted servo burst signals.

2. The disk drive as recited in claim 1, wherein the control circuitry is operable to adjust an amplitude of the servo burst signals.

3. The disk drive as recited in claim 2, wherein the control circuitry is operable to adjust the amplitude of the servo burst signals relative to a reference point defined by the servo bursts.

4. The disk drive as recited in claim 3, wherein the servo bursts comprise a quadrature servo pattern comprising A, B, C and D servo bursts.

5. The disk drive as recited in claim 4, wherein the control circuitry is operable to adjust the amplitude of the servo burst signals according to:

$$\begin{bmatrix} \overline{C} \\ \overline{A} \\ \overline{B} \\ \overline{D} \end{bmatrix} = \begin{bmatrix} \cos(vTc) & \sin(vTa) & 0 & 0 \\ -\sin(vTc) & \cos(vTa) & 0 & 0 \\ 0 & 0 & \cos(vTb) & \sin(vTd) \\ 0 & 0 & -\sin(vTb) & \cos(vTd) \end{bmatrix} \begin{bmatrix} C \\ A \\ B \\ D \end{bmatrix}$$

wherein:
v is the radial velocity of the head;
Ta is an interval defined by servo burst A and the reference point;
Tb is an interval defined by servo burst B and the reference point;
Tc is an interval defined by servo burst C and the reference point; and
Td is an interval defined by servo burst D and the reference point.

6. The disk drive as recited in claim 5, wherein the control circuitry is operable to adjust the amplitude of the servo burst signals according to:

$$\begin{bmatrix} \hat{N} \\ \hat{Q} \end{bmatrix} = \begin{bmatrix} \overline{C} - \overline{D} \\ \overline{A} - \overline{B} \end{bmatrix} = \begin{bmatrix} \cos(vTc) & \sin(vTc) & \sin(vTb) & -\cos(vTd) \\ -\sin(vTc) & \cos(vTa) & -\cos(vTb) & -\sin(vTd) \end{bmatrix} \begin{bmatrix} C \\ A \\ B \\ D \end{bmatrix}$$

where the position error signal is generated in response to N and Q.

7. The disk drive as recited in claim 6, wherein the control circuitry is operable to adjust the amplitude of the servo burst signals according to:

$$\begin{bmatrix} \overline{N} \\ \overline{Q} \end{bmatrix} = \begin{bmatrix} \frac{1}{\cos(vTc)^2 + \sin(vTa)^2} & 0 \\ 0 & \frac{1}{\sin(vTd)^2 + \cos(vTb)^2} \end{bmatrix} \begin{bmatrix} \hat{N} \\ \hat{Q} \end{bmatrix}.$$

8. The disk drive as recited in claim 4, wherein the control circuitry is operable to adjust the amplitude of the servo burst signals according to:

$$N = C - D \quad Q = A - B$$
$$\overline{N} = N\cos(vTa) \quad \overline{Q} = Q\cos(vTc)$$

wherein:
v is the radial velocity of the head;
Ta is an interval defined by servo burst A and the reference point;
Tb is an interval defined by servo burst B and the reference point;
Tc is an interval defined by servo burst C and the reference point; and
Td is an interval defined by servo burst D and the reference point.

9. The disk drive as recited in claim 3, wherein the servo bursts comprise a first servo burst comprising a first phase and a second servo burst comprising a second phase different from the first phase.

10. The disk drive as recited in claim 9, wherein the servo bursts comprise a null-phase servo pattern comprising N and Q servo bursts.

11. The disk drive as recited in claim 10, wherein the control circuitry is operable to adjust the amplitude of the servo burst signals according to:

$$\begin{bmatrix} \overline{N} \\ \overline{Q} \end{bmatrix} = \begin{bmatrix} \cos(vT_N) & \sin(vT_Q) \\ -\sin(vT_N) & \cos(vT_Q) \end{bmatrix} \begin{bmatrix} N \\ Q \end{bmatrix}$$

wherein:
v is the radial velocity of the head;
$T_N$ is an interval defined by servo burst N and the reference point; and
$T_Q$ is an interval defined by servo burst Q and the reference point.

12. The disk drive as recited in claim 3, wherein each servo sector comprises a track address, the control circuitry is operable to:
read a track address in one of the servo sectors to generate a track address signal; and
adjust the track address signal in response to the radial velocity of the head.

13. The disk drive as recited in claim 12, wherein the control circuitry is operable to adjust the track address signal according to:

TrackID=TrackID+round[v·(t0−T0)]

wherein:
TrackID is the track address signal;
v is the radial velocity of the head;
t0 is the reference point; and
(t0−T0) is an interval defined by the track address and the reference point.

14. A method of operating a disk drive comprising a head actuated over a disk comprising a plurality of servo sectors that define a plurality of servo tracks, wherein the servo sectors comprise a plurality of servo bursts, the method comprising:
detecting a radial velocity of the head relative to the servo tracks;
reading at least two of the servo bursts to generate servo burst signals;
adjusting the servo burst signals in response to the radial velocity of the head; and
generating a position error signal for the head in response to the adjusted servo burst signals.

15. The method as recited in claim 14, further comprising adjusting an amplitude of the servo burst signals.

16. The method as recited in claim 15, further comprising adjusting the amplitude of the servo burst signals relative to a reference point defined by the servo bursts.

17. The method as recited in claim 16, wherein the servo bursts comprise a quadrature servo pattern comprising A, B, C and D servo bursts.

18. The method as recited in claim 17, further comprising adjusting the amplitude of the servo burst signals according to:

$$\begin{bmatrix} \overline{C} \\ \overline{A} \\ \overline{B} \\ \overline{D} \end{bmatrix} = \begin{bmatrix} \cos(vTc) & \sin(vTa) & 0 & 0 \\ -\sin(vTc) & \cos(vTa) & 0 & 0 \\ 0 & 0 & \cos(vTb) & \sin(vTd) \\ 0 & 0 & -\sin(vTb) & \cos(vTd) \end{bmatrix} \begin{bmatrix} C \\ A \\ B \\ D \end{bmatrix}$$

wherein:
v is the radial velocity of the head;
Ta is an interval defined by servo burst A and the reference point;
Tb is an interval defined by servo burst B and the reference point;
Tc is an interval defined by servo burst C and the reference point; and
Td is an interval defined by servo burst D and the reference point.

19. The method as recited in claim 18, further comprising adjusting the amplitude of the servo burst signals according to:

$$\begin{bmatrix} \hat{N} \\ \hat{Q} \end{bmatrix} = \begin{bmatrix} \overline{C} - \overline{D} \\ \overline{A} - \overline{B} \end{bmatrix} = \begin{bmatrix} \cos(vTc) & \sin(vTa) & \sin(vTb) & -\cos(vTd) \\ -\sin(vTc) & \cos(vTa) & -\cos(vTb) & -\sin(vTd) \end{bmatrix} \begin{bmatrix} C \\ A \\ B \\ D \end{bmatrix}$$

where the position error signal is generated in response to $\hat{N}$ and $\hat{Q}$.

20. The method as recited in claim 19, further comprising adjusting the amplitude of the servo burst signals according to:

$$\begin{bmatrix} \overline{N} \\ \overline{Q} \end{bmatrix} = \begin{bmatrix} \frac{1}{\cos(vTc)^2 + \sin(vTa)^2} & 0 \\ 0 & \frac{1}{\sin(vTd)^2 + \cos(vTb)^2} \end{bmatrix} \begin{bmatrix} \hat{N} \\ \hat{Q} \end{bmatrix}.$$

21. The method as recited in claim 17, further comprising adjusting the amplitude of the servo burst signals according to:

$$N = C - D \quad Q = A - B$$
$$\overline{N} = N\cos(vTa) \quad \overline{Q} = Q\cos(vTc)$$

wherein:
v is the radial velocity of the head;
Ta is an interval defined by servo burst A and the reference point;
Tb is an interval defined by servo burst B and the reference point;
Tc is an interval defined by servo burst C and the reference point; and
Td is an interval defined by servo burst D and the reference point.

22. The method as recited in claim 16, wherein the servo bursts comprise a first servo burst comprising a first phase and a second servo burst comprising a second phase different from the first phase.

23. The method as recited in claim 22, wherein the servo bursts comprise a null-phase servo pattern comprising N and Q servo bursts.

24. The method as recited in claim 23, further comprising adjusting the amplitude of the servo burst signals according to:

$$\begin{bmatrix} \overline{N} \\ \overline{Q} \end{bmatrix} = \begin{bmatrix} \cos(vT_N) & \sin(vT_Q) \\ -\sin(vT_N) & \cos(vT_Q) \end{bmatrix} \begin{bmatrix} N \\ Q \end{bmatrix}$$

wherein:
v is the radial velocity of the head;
$T_N$ is an interval defined by servo burst N and the reference point; and
$T_Q$ is an interval defined by servo burst Q and the reference point.

25. The method as recited in claim 16, wherein each servo sector comprises a track address, further comprising:
reading a track address in one of the servo sectors to generate a track address signal; and
adjusting the track address signal in response to the radial velocity of the head.

26. The method as recited in claim 25, further comprising adjusting the track address signal according to:

TrackID=TrackID+round[v·(t0−T0)]

wherein:
TrackID is the track address signal;
v is the radial velocity of the head;
t0 is the reference point; and
(t0−T0) is an interval defined by the track address and the reference point.

\* \* \* \* \*